United States Patent
Weigl et al.

(10) Patent No.: US 11,377,147 B2
(45) Date of Patent: Jul. 5, 2022

(54) DAMPING OF AN OSCILLATION OF A SUPERIMPOSED STEERING SYSTEM

(71) Applicant: AUDI AG, Ingolstadt (DE)

(72) Inventors: Bastian Weigl, Ingolstadt (DE); Andre Saal, Buxheim (DE)

(73) Assignee: AUDI AG, Ingolstadt (DE)

( * ) Notice: Subject to any disclaimer, the term of this patent is extended or adjusted under 35 U.S.C. 154(b) by 639 days.

(21) Appl. No.: 16/375,386

(22) Filed: Apr. 4, 2019

(65) Prior Publication Data
US 2019/0315397 A1    Oct. 17, 2019

(30) Foreign Application Priority Data

Apr. 12, 2018 (DE) .......................... 102018205537.8

(51) Int. Cl.
*B62D 6/06* (2006.01)
*B62D 5/04* (2006.01)
*B62D 5/06* (2006.01)
*B62D 7/22* (2006.01)

(52) U.S. Cl.
CPC ............. *B62D 6/06* (2013.01); *B62D 5/0472* (2013.01); *B62D 5/06* (2013.01); *B62D 7/222* (2013.01)

(58) Field of Classification Search
None
See application file for complete search history.

(56) References Cited

U.S. PATENT DOCUMENTS

2009/0192665 A1* 7/2009 Nozawa ............... B62D 5/0487
701/31.4

FOREIGN PATENT DOCUMENTS

| CN | 102019955 A | 4/2011 |
|---|---|---|
| CN | 105593105 A | 5/2016 |
| DE | 10337956 A1 | 4/2005 |
| DE | 102004051338 A1 | 4/2006 |
| DE | 102009020826 A1 | 1/2010 |
| DE | 102009057166 A1 | 6/2011 |
| DE | 102011086295 A1 | 6/2012 |
| DE | 102013113027 A1 | 5/2015 |
| EP | 2 945 277 A1 | 11/2015 |
| EP | 3020617 A1 | 5/2016 |
| JP | H0939809 A * | 2/1997 |
| JP | 2007333657 A | 12/2007 |

OTHER PUBLICATIONS

Machine translation of DE10337956A1 (Year: 2005).*
Chinese Office Action dated May 8, 2021, in connection with corresponding CN Application No. 201910289100.3 (10 pp., including machine-generated English translation).

(Continued)

*Primary Examiner* — Anne Marie Antonucci
*Assistant Examiner* — Kyle S Park
(74) *Attorney, Agent, or Firm* — Maier & Maier, PLLC

(57) ABSTRACT

A method for damping an oscillation of a superimposed steering system of a motor vehicle in which a sensor of the superimposed steering system detects an actual steering angle of a motor of the superimposed steering system and a control device of the superimposed steering system determines an oscillation of the superimposed steering system as a periodic change of the detected actual steering angle and, in the case of a determined oscillation, carries out a measure for damping the oscillation.

7 Claims, 3 Drawing Sheets

(56) References Cited

OTHER PUBLICATIONS

German Search Report dated Jan. 11, 2019 in corresponding German Application No. 102018205537.8; 17 pages; Partial English translation attached.
German Office Action dated Jun. 7, 2021, in connection with corresponding DE Application No. 10 2018 205 537.8 (8pp., including machine-generated English translation).

* cited by examiner

DAMPING OF AN OSCILLATION OF A SUPERIMPOSED STEERING SYSTEM

FIELD

The present disclosure relates to a method for damping an oscillation of a superimposed steering system of a motor vehicle in which a sensor of the superimposed steering system detects an actual steering angle of a motor of the superimposed steering system and a control device of the superimposed steering system determines an oscillation of the superimposed steering system as a periodic change of the detected actual steering angle and, in the case of a determined oscillation, carries out a measure for damping the oscillation. Furthermore, the invention relates to a control device for a superimposed steering system and a superimposed steering system with a control device.

BACKGROUND

Steering systems of vehicles serve to determine a direction of travel during steering, i.e., a rotating of wheels about a vertical yaw axis during travel. To this end, a steering system of a vehicle usually comprises a steering train which loads steered wheels, usually the front wheels of the vehicle, with a torque in order to rotate them about a vertical yaw axis. Accordingly, the steering system comprises a rotatable actuation means, in particular a steering wheel, which is connected in a non-rotating manner to the steering train and is rotated by a driver of the vehicle in order to steer the vehicle around a steering angle. A torque generated by the driver by rotating the steering wheel is transmitted by the steering train onto the steered wheels.

An important property of steering systems for motor vehicles consists in that the steered wheels are appropriately in contact with a road which is loaded via the wheels with the weight of the vehicle and receives it. The circumferential surfaces of the wheels, which are usually formed by air-filled tires, as well as the road are provided with a gripping surface for reasons of travel safety. Consequently, each rotation of the steered wheels about the yaw axis is countered by a frictional force. This force is substantially determined by a coefficient of friction which is a function of the material and the surfaces.

A distinction is to be made between a coefficient of sliding friction which determines the sliding force during a sliding of the wheels on the road and a coefficient of static friction which determines the frictional force during a transition from a resting of the wheels to a sliding. The coefficient of static friction is generally greater than the coefficient of sliding friction, for which reason the frictional force to be initially overcome in each steering is greater than the frictional force to be overcome during the steering. Consequently, an unfavorable response behavior can result for the steering system.

In order to improve this problem, DE 10 2009 057 166 A1 discloses a vehicle steering system with an improved reaction behavior. The vehicle steering system comprises means for recognizing an inactivity of the vehicle driver, for example, when traveling straight ahead or in a curve travel with a constant steering angle and comprises means for generating a low-amplitude vibrational oscillation which is superimposed on a current steering angle in a manner which is not noticeable by the driver when an inactivity of the driver is recognized. In this manner the vehicle steering system is held minimally in motion even in travel sections with a constant steering angle so that a transition from a static friction to a sliding friction which at least partially causes a poor reaction behavior is largely eliminated.

Due to the friction between the steered wheels and the road, a steering of the vehicle by the driver can furthermore require a large application of force. So-called EPS (Electric Power Steering)systems or, colloquially, servosteering systems should counteract this. A servosteering system comprises a control device, a motor, preferably a servomotor, connected to the control device, and comprises a sensor, at least one torque sensor, connected to the control device.

The steered wheels are loaded with a torque about the yaw axis by a rotating of the steering wheel. During this time, the torque sensor continuously detects a steering moment set by the driver by rotating the steering wheel, which moment is also designated as a hand moment, and transmits the detected steering moment to the control device. Starting from the transmitted steering moment, the control device calculates a supporting torque according to a regulating mechanism and appropriately controls the motor. The supporting torque produced by the motor is superimposed on the torque set by the driver with the steering wheel, which perceptibly facilitates a steering of the vehicle for the driver.

Modern vehicles comprise, in addition, so-called superimposed steering systems (dynamic steering systems). A superimposed steering system determines a superimposed angle which is superimposed on the steering angle of the steering wheel in order to achieve a variable translation of the steering angle. In this manner a more direct or more indirect steering translation can be achieved in a variable manner. For example, the steering movements required for steering the vehicle can be reduced.

However, an oscillation, i.e., a vibrating or fluttering of the superimposed steering system can occur during the operation of the superimposed steering system due to external disturbances and/or a configuration of the motor and/or a configuration of the sensor. The driver perceives the latter on his hands and arms since the torque produced by the motor is supported on the steering wheel and therefore on the hands of the driver. Such an oscillation is generally perceived as disturbing or unpleasant in (quasi-) stationary driving situations such as when driving straight ahead or in curve travel with a constant steering angle. Consequently, efforts are being made to avoid or to at least attenuate an oscillating of superimposed steering systems.

Accordingly, DE 10 2004 051 338 A1 discloses a device and a method for damping rotary oscillations of a steering wheel of a vehicle. The device comprises an actuator which is configured to load a steering train of the vehicle, which train is connected to the steering wheel, with a torque. In the method opposing oscillations are introduced into the steering train by the actuator which compensate periodic rotary oscillations of the steering train and stabilize the steering wheel in this manner Undesired rotary oscillations of the steering train are recognized by their periodicity.

Accordingly, DE 10 2011 086 295 A1 discloses a servosteering system for a vehicle. The servosteering system comprises an electrical servomotor for generating a torque which supports a steering movement of a driver of the vehicle and comprises a control device for controlling the electrical servomotor by varying the strength of a control current. The control device is connected to a torque sensor which is configured to detect a disturbing periodic oscillation and to supply a corresponding signal to the control device. During the operation of the device the control device superposes the control current with a compensation current directed against the disturbing periodic oscillation. The supporting torque generated as a result by the servomotor appropriately compensates the disturbing oscillation so that the driver does not perceive the disturbing periodic oscillation.

However, in this solution a few successive, rapidly opposingly directed deflections of the steering angle can already be falsely determined as a disturbing oscillation so that the measure against the oscillation is itself perceived as disturbing.

SUMMARY

The invention therefore has the object of suggesting an improved method for damping an oscillation of a superimposed steering system which avoids the described disadvantages. In addition, the invention has the object of creating an improved control device for a superimposed steering system and an improved superimposed steering system.

The invention has as subject matter a method for damping an oscillation of a superimposed steering system of a vehicle in which a sensor of the superimposed steering system detects an actual steering angle of a motor of the superimposed steering system, and a control device of the superimposed steering system determines an oscillation of the superimposed steering system as a periodic change of the detected actual steering angle and upon a determined oscillation it carries out a measure for damping the oscillation. The method has the goal of counteracting an undesired oscillation of the superimposed steering system. The actual steering angle of the motor is continuously detected in order to determine an oscillation. An oscillation and/or vibration of the steering wheel can be reduced or eliminated by adequate countermeasures. Consequently, it is not perceived as unpleasant or disturbing by a driver of the vehicle through his hands and arms, as a result of which the driver has a better steering feel.

In the method according to the invention, the control device carries out the measure as a function of the number of periods or of semi-periods of the periodic change Therefore, the measure is carried out if a certain condition in time has been met. Therefore, in this manner not every phase during which the actual steering angle changes periodically has to be associated with a measure. Accordingly, a superfluous measure is avoided which can also be perceived as disturbing or unpleasant by the driver.

In a preferred embodiment the control device counts periods or semi-periods of the periodic change and/or the control device starts the measure when the number of periods or the number of semi-periods reaches or exceeds a predetermined actuation value, and/or varies the measure as a function of the counted periods or semi-periods, and/or the control device terminates the measure if it no longer determines any oscillation of the superimposed steering system and/or if at least one other exit condition has been met, and/or the control device sets a counter for counting the periods or semi-periods to zero with or after the end of the measure. Therefore, the actuation value forms a starting condition for the measure. Given a suitably selected actuation value, a short and therefore hardly disturbing or unpleasant oscillation does not initiate any measure because the final condition has already been met before the starting condition. Of course, the meter must be set back before each counting procedure. In addition, in the case of a longer-lasting oscillation the method can be varied, for example, as a function of operating parameters of the vehicle.

In another embodiment the control device determines an oscillation if the frequency of the periodic change is in a predetermined frequency range and/or if the amplitude of the periodic change is in a predetermined amplitude range. These two conditions for the carrying out of a measure are filter conditions. They ensure that a counting of periods or of semi-periods only takes place upon an oscillation which is both strong enough as well as neither too low-frequency nor too high-frequency.

In other embodiments the control device carries out the measure as a function of at least one other criterion met in particular for a given minimum time, in particular as a function of a traveling speed of the vehicle, of a steering wheel angle, of a steering wheel angle speed, of a control deviation of an actual steering angle from a theoretical steering angle and/or of a steering moment. The method is improved more in that the carrying out of a measure is additionally made subject to one or more operating parameters of the vehicle.

In a preferred embodiment the control device creates a continuous transition between a phase without a measure and a phase with a measure, in particular by a filtering or a limiting of a gradient at the beginning and/or at the end of the measure. In other words, an abrupt starting and/or ending of the measure is avoided, which further improves the steering feel for the driver.

In other embodiments the control device supplies the motor with a control current which is reduced in comparison to the normal operation of the superimposed steering system as a measure against the oscillation. A reduction of the control current entails a correspondingly reduced torque of the motor. This modification can already suffice for eliminating the oscillation of the superimposed steering system. In other words, one from several operating parameters causing the oscillation is sufficiently changed in order to attenuate the oscillation.

Alternatively or additionally, the control device can supply the motor with a control current counteracting the oscillation as a measure against the oscillation. The control device can achieve a negative interference between the oscillation and the control current in that it adjusts the control current in counterphase to the oscillation. In contrast to the previously described measure, this measure actively reduces the oscillation.

Aside from the cited influences on the motor, every other measure concerning the controlling of the motor which contributes to a damping of the oscillation falls under the protective scope of the invention, for example, a pulse width modulation (PWM) of the control current driving the motor, or a braking moment/holding moment which is generated by an electrical motor and counteracts the oscillation.

The invention also has as subject matter a control device for a superimposed steering system of a vehicle, which is configured to determine an oscillation of the superimposed steering system as a periodic change of an actual steering angle of a motor of the superimposed steering system which motor is connected to the control device. The control device accordingly determines an oscillation directly on the actual steering angle of the motor of the superimposed steering system. To this end, the control device can comprise, for example, a rotary angle sensor or can be connected to a rotary angle sensor which is coupled on the output side to the motor.

The control device according to the invention is configured to carry out, upon a determined oscillation as a function of a period number or semi-period number of the periodic change, a measure against the oscillation, in particular in a method according to the invention. Therefore, the measure assumes, on the one hand, a determined oscillation. On the other hand, a certain time condition must be additionally met which is implemented as a function of the period number or semi-period number of the periodic change of the actual steering angle. The configuration of the control device advantageously makes possible an execution of the above-described method.

In a preferred embodiment the control device comprises a meter for counting the periods or semi-periods and comprises a predetermined actuation value and is configured to begin the measure when the period number or semi-period number reaches or exceeds the predetermined actuation value and/or to vary the measure as a function of the counted periods or semi-periods, to terminate the measure when it no longer determines any oscillation and/or when at least one other exit condition has been met, and to set the meter to zero with or after the end of the measure. Other exit conditions can be a changed driving state, a changed driving situation, a driving request, for example, a driver input by steering. The taking account of an exit condition for terminating the measure can also be linked to a certain minimum time of the presence of the exit condition and/or to an exceeding of certain boundary values, for example, boundary values for a changing of a theoretical motor angle after the beginning of the measure, a control deviation, a steering angle speed for a change of the steering angle. The method can be further improved by considering other exit conditions, i.e., operating parameters of the vehicle, in that a too early or too late termination of the measure is avoided. Consequently, on the one hand, the steering feel of the driver but also the reaction behavior of the superimposed steering system, on the other hand, can be improved.

Another subject matter of the invention is a superimposed steering system which comprises a control device, in particular a control device according to the invention, a motor connected to the control device and comprises a sensor connected to the control device for detecting an actual steering angle of the motor, in which the control device is configured to determine an oscillation of the superimposed steering system as a periodic change of the actual steering angle detected by the sensor. The sensor can be designed as a rotary angle sensor and/or be integrated in the control device. The superimposed steering system advantageously comprises the above-described control system.

The superimposed steering system according to the invention is configured, when an oscillation dependent on a period number or on a semi-period number of the periodic change has been determined, to carry out a measure against the oscillation, in particular in a method according to the invention. Therefore, the measure assumes, on the one hand, a determined oscillation. On the other hand, a certain condition of time must be additionally met which is implemented as a function of the period number of the semi-period number of the periodic change of the actual steering angle. The configuration of the superimposed steering system advantageously makes it possible to carry out the above-described method.

BRIEF DESCRIPTION OF THE FIGURES

The disclosure is schematically shown using embodiments in the drawings and is described further with reference made to the drawings. In the drawings.

DETAILED DESCRIPTION

Figure 1:
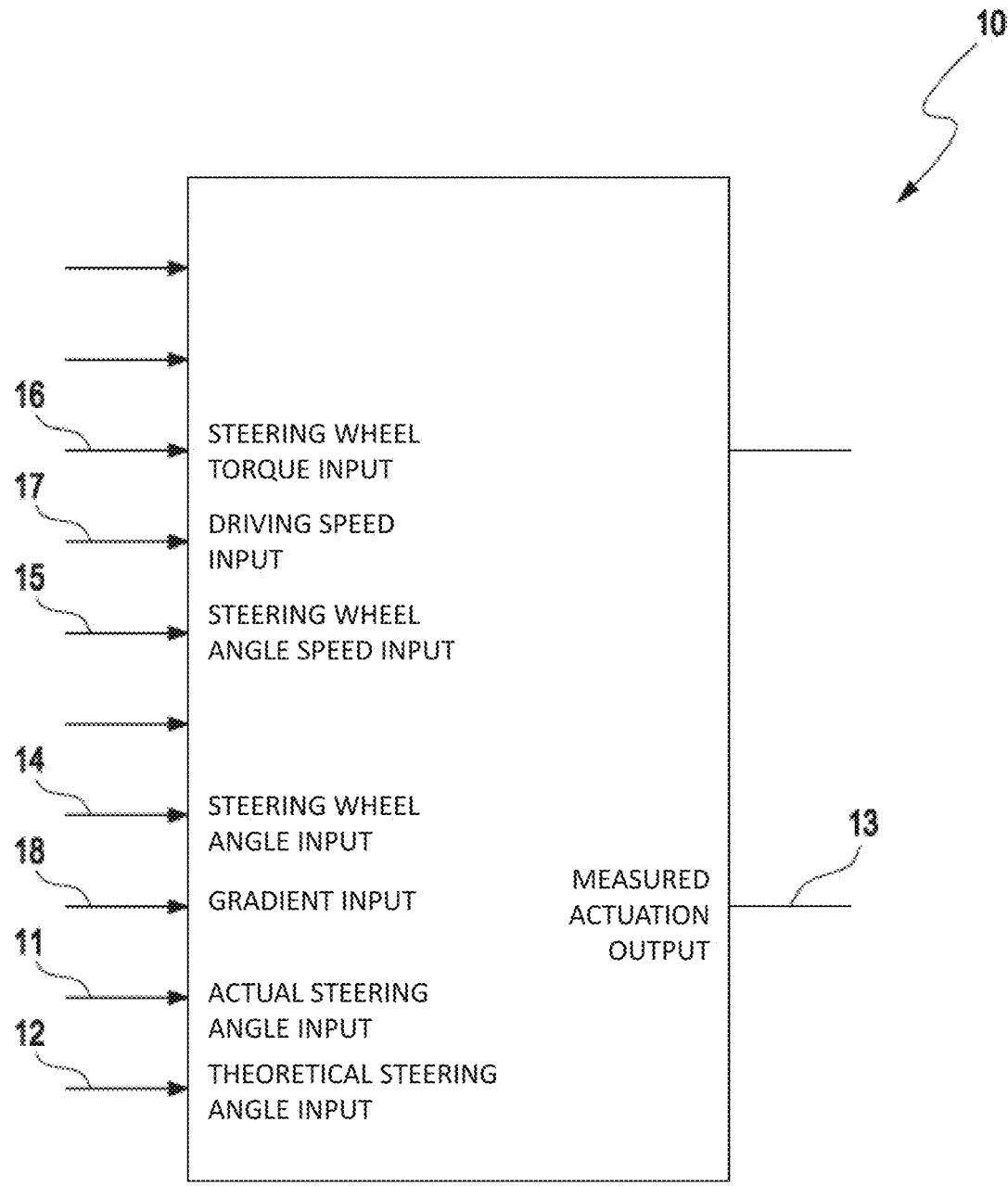
FIG. 1 shows a schematic view of a block diagram of a module of an embodiment of a control device according to the invention for an embodiment of a superimposed steering system according to the invention.

FIG. 1 shows a schematic view of a block diagram of a module 10 of an embodiment of a control device according to the invention for an embodiment of a superimposed steering system of a vehicle and according to the invention.

The module 10 is designed as an integrated switching circuit and comprises an actual steering angle input 11, a theoretical steering angle input 12, a measure actuation output 13, a steering wheel steering angle input 14, a steering wheel angle speed input 15, a steering wheel torque input 16, a driving speed input 17 and a gradient input 18.

Figure 2:
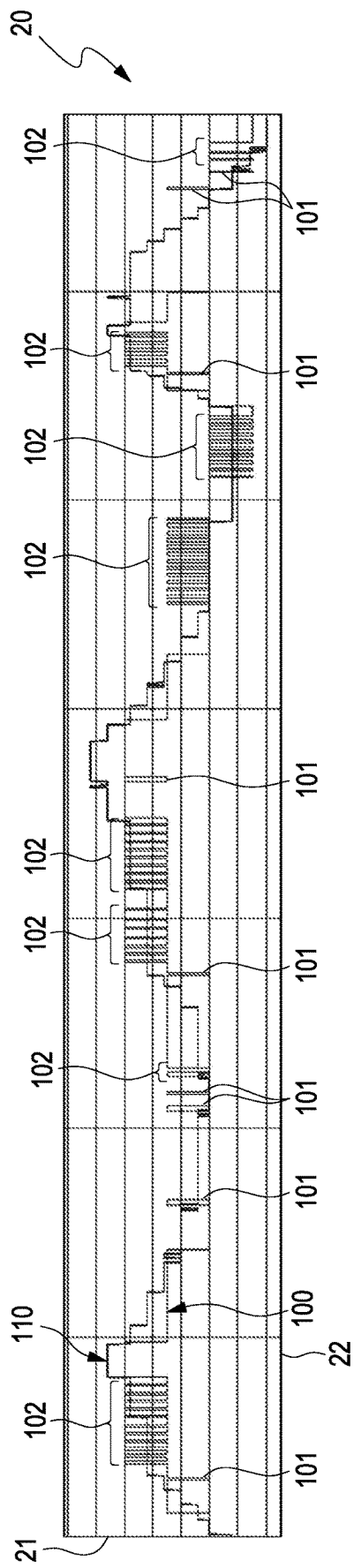
FIG. 2 shows a diagram of a course in time of a theoretical steering angle and of an actual steering angle comprising an oscillation in sections.

The superimposed steering system comprises the control device with the module 10, a motor connected to the control device and comprises a sensor connected to the control device for detecting an actual steering angle 100 of the motor shown in FIG. 2.

Figure 3:
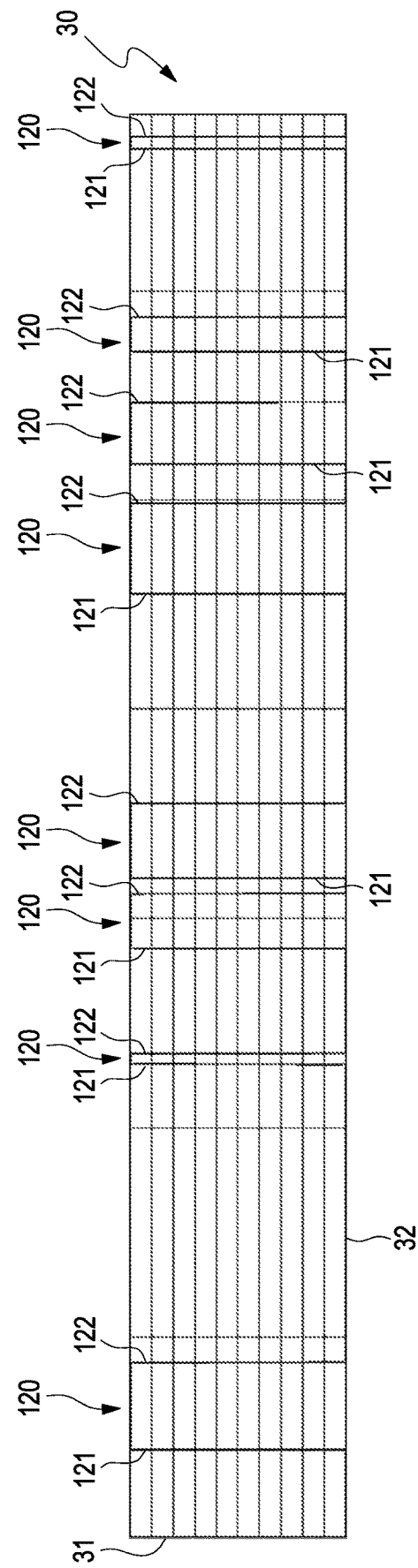
FIG. 3 shows a diagram of the course in time corresponding to FIG. 2 of a measure corresponding to an embodiment of the method according to the invention.

The control device is configured to determine an oscillation 101, 102 of the superimposed steering system as a periodic change of the actual steering angle 100 detected by the sensor and when an oscillation 101, 102 is determined as a function of a period number or of a semi-period number of the periodic change, a measure 120 against the oscillation 101, 102 shown in FIG. 3 is engaged. To this end, the control device comprises a meter for counting the periods and/or semi-periods and a predetermined actuation value and is configured to start the measure 120 when the period number or semi-period number has reached or exceeded the predetermined actuation value and to terminate the measure 120 when it no longer determines an oscillation and/or when at least one other exit condition has been met, and to set the meter to zero with or after the end 122 of the measure 120.

During the operation of the superimposed steering system the sensor continuously detects the actual steering angle 100 of the motor. The control device determines an oscillation 101, 102 of the superimposed steering system as a periodic change of the detected actual steering angle 100 when the frequency of the periodic change is in a predetermined frequency range and the amplitude of the periodic change is in a predetermined amplitude range.

When an oscillation 101, 102 has been determined, the control device carries out a measure 120 for damping the oscillation 101, 102 as a function of a period number or of a semi-period number of the periodic change.

To this end, the control device counts periods or semi-periods of the periodic change and starts the measure 120 when the period number or semi-period number exceeds the predetermined actuation value. The control device terminates the measure 120 when it no longer determines an oscillation 101, 102 of the superimposed steering system and/or if another exit condition has been met and sets the meter for counting the periods or semi-periods to zero after the end 122 of the measure 120.

In addition, the control device can make the carrying out of a measure 120 dependent on other criteria such as, for example, a travel speed of the vehicle, a steering wheel angle, a steering wheel angular speed, a deviation from a control of an actual steering angle from a theoretical steering angle, and/or a steering moment. Furthermore, the carrying out of the measure 120 can be linked to the fact that the other criteria for a given minimum duration have been met and/or that certain boundary limits have been dropped below or exceeded.

The control device supplies the motor with a reduced control current as measure 120 against the oscillation 101, 102. Alternatively or additionally, the control device can supply the motor with a control current which counteracts the oscillation 101, 102 in comparison to the normal operation of the superimposed steering system. In doing so, the control device creates continuous transitions between phases without measure 120 and phases of a measure 120 by a filtering or by a limiting of a gradient at the beginning 121 and the end 122 of a measure 120.

Figure 4:
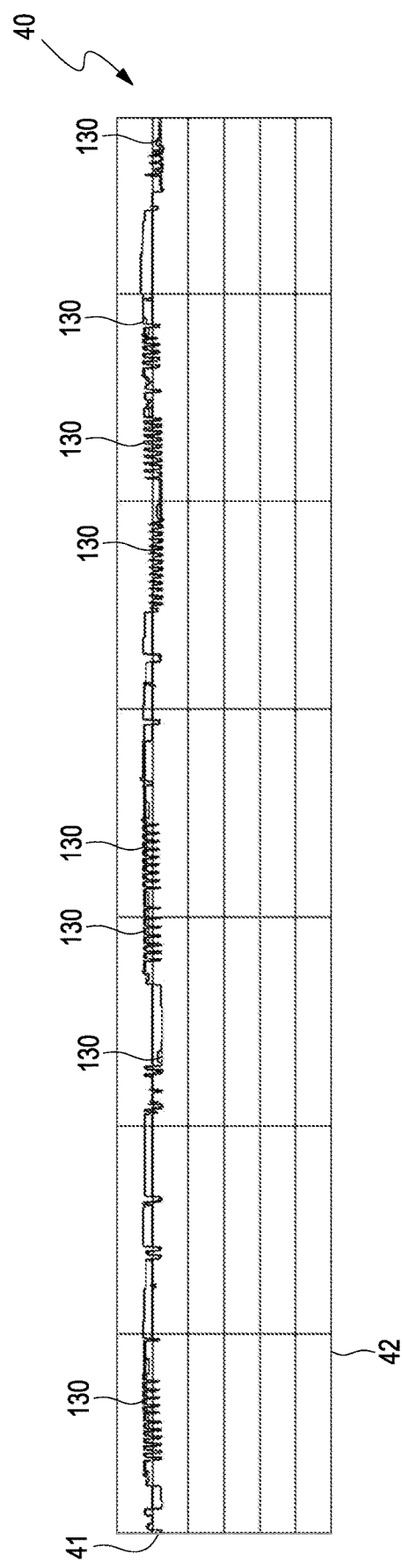
FIG. 4 shows a diagram of the course in time corresponding to FIG. 2 of the reduced control current counter to the oscillation corresponding to an embodiment of the method of the invention.

For a better view, the operation of the method is shown in detail in the FIGS. 2 to 4.

FIG. 2 shows a diagram 20 of a course in time of a theoretical steering angle 110 and of an actual steering angle 100. An angle measure is entered on the ordinate 21 and a time measure on the abscissa 22. The actual steering angle 100 has periodic changes in sections determined by the control device as oscillations 101, 102.

FIG. 3 shows a diagram 30 of the course in time of a measure 120 corresponding to FIG. 2 and to an embodiment of the method of the invention. An activity of the measure is recorded on the ordinate 31 and the measure of time shown in FIG. 2 is recorded on the abscissa 32. The activity value 0 means here that no measure is activated against an oscillation, and the value 1 means that the measure is activated against an oscillation. It is apparent from the course in time of the measure 120 that the measure 120 is carried out and ended several times in the time section considered, i.e., the time course has an alternating sequence of a beginning 121 of the measure 120 and an end 122 of the measure 120. It is clear from a comparison with FIG. 2 that not every periodic change of the actual steering angle 100 initiates the beginning 121 of a measure 120 but rather a measure 120 is not carried out until the number of periods or of semi-periods is greater than the actuation value. Therefore, a very short oscillation 101 shown in FIG. 2 does not initiate a measure 120 whereas a longer oscillation 102 shown in FIG. 2 initiates a measure 120 which, however, is initiated only by the second period or the third semi-period of the particular oscillation 102.

FIG. 4 shows a diagram 40 of the course in time of a reduced control current 130 and corresponding to FIG. 2, as a measure against the oscillation according to an embodiment of the method of the invention. A current strength of the reduced control current 130 is entered on the ordinate 41 and the time measurement shown in the FIGS. 2 and 3 is entered on the abscissa 42. It becomes clear from a comparison with FIG. 3 that the motor of the superimposed steering system receives current exactly in the phases with a reduced control current 130 in which a measure 120 is active, that is, between a beginning 121 and an end 122 of a measure 120 in each case.

The method according to the invention has the advantage that it avoids unnecessary measures 120 against an oscillation of the superimposed steering system and in this manner ensures a pleasant steering feel for a driver of the vehicle.

The invention claimed is:

1. A method for damping an oscillation of a superimposed steering system of a vehicle, comprising:
    detecting, using a sensor of the superimposed steering system, an actual steering angle of a motor of the superimposed steering system,
    determining an oscillation of the superimposed steering system as a periodic change of the detected actual steering angle by counting a number of periods or semi-periods of the periodic change, and
    upon a determined oscillation, executing a measure for reducing the oscillation as a function of a period number or semi-period number of the periodic change, when the number of periods or the number of semi-periods reaches or exceeds a predetermined actuation value, wherein the measure for reducing oscillation comprises supplying the motor with a control current opposed to the oscillation.

2. The method for damping an oscillation of a superimposed steering system of a vehicle of claim 1, further comprising varying the oscillation as a function of the counted periods or semi-periods.

3. The method for damping an oscillation of a superimposed steering system of a vehicle of claim 1, further comprising terminating the measure for reducing the oscillation if the oscillation of the superimposed steering system is not detected and/or if at least one other exit condition is met.

4. The method for damping an oscillation of a superimposed steering system of a vehicle of claim 3, further comprising setting a counter to zero after terminating the measure for reducing the oscillation, wherein the counter is configured to count the periods or semi-periods.

5. The method for damping an oscillation of a superimposed steering system of a vehicle of claim 1, wherein determining the oscillation further comprises determining a frequency of the periodic change is in a predetermined frequency range and/or if an amplitude of the periodic change is in a predetermined amplitude range.

6. The method for damping an oscillation of a superimposed steering system of a vehicle of claim 1, wherein the measure is executed as a function of one or more of: a traveling speed of the vehicle, a steering wheel angle, a steering wheel angular speed, a control deviation of an actual steering angle from a theoretical steering angle, and a steering moment.

7. The method for damping an oscillation of a superimposed steering system of a vehicle of claim 1, wherein the measure for reducing oscillation comprises supplying the motor with the control current which is reduced in comparison to a normal operation of the superimposed steering system.

* * * * *